United States Patent [19]
Shinn

[11] Patent Number: 5,873,534
[45] Date of Patent: Feb. 23, 1999

[54] CUTTER TOOTH HOLDER ASSEMBLY

[76] Inventor: Rickey D. Shinn, 7851 Reed Mine Rd., Stanfield, N.C. 28163

[21] Appl. No.: 962,254

[22] Filed: Oct. 31, 1997

[51] Int. Cl.$^6$ .................................................. B02C 13/08
[52] U.S. Cl. ............................................................ 241/294
[58] Field of Search ................................ 83/698.41, 955, 83/839, 840, 841; 241/294, 101.72, 101.74, 101.742; 407/34, 40, 42, 48, 413

[56] References Cited

U.S. PATENT DOCUMENTS

| | | | |
|---|---|---|---|
| 3,818,561 | 6/1974 | Montana et al. | 29/95 R |
| 3,937,261 | 2/1976 | Blum | 144/218 |
| 4,932,447 | 6/1990 | Morin | 144/34 R |
| 4,958,775 | 9/1990 | Arasmith | 241/88.1 |
| 5,205,199 | 4/1993 | MacLennan . | |
| 5,303,752 | 4/1994 | MacLennan . | |
| 5,307,719 | 5/1994 | MacLennan . | |
| 5,499,771 | 3/1996 | Esposito et al. | 241/101.74 |
| 5,544,826 | 8/1996 | Klingler et al. | 241/242 |
| 5,655,582 | 8/1997 | Morin | 144/176 |
| 5,692,689 | 12/1997 | Shinn | 241/101.72 |

*Primary Examiner*—Mark Rosenbaum
*Assistant Examiner*—William Hong
*Attorney, Agent, or Firm*—Adams Law Firm, P.A.

[57] ABSTRACT

A cutter tooth holder assembly is adapted for attaching a cutter tooth having a plurality of spaced cutting tips to a rotatable cutter drum. The tooth holder assembly includes a base for being mounted to an outer peripheral surface of the cutter drum. The base has a tooth-locking, circumferentially-extending groove formed in its top surface. A tooth holder is positioned in the tooth-locking groove, and has a front bearing surface residing adjacent a back end of the cutter tooth. The cutter tooth is arranged such that one of the cutting tips resides in the tooth-locking groove to prevent rotational movement of the cutter tooth during operation of the cutter drum, while an opposed second one of the cutting tips resides in a cutting position relative to the outer surface of the drum. An elongate, threaded bolt cooperates with the tooth holder for attaching the cutter tooth to the tooth holder assembly.

12 Claims, 2 Drawing Sheets

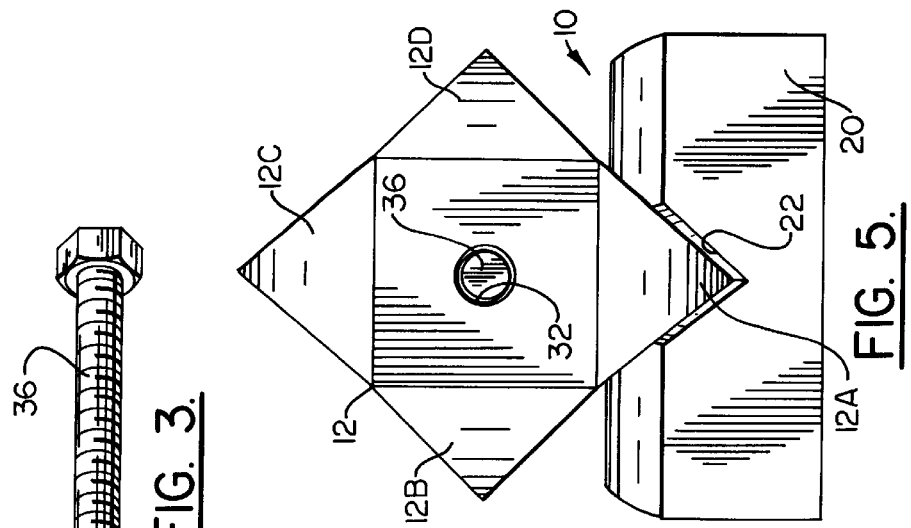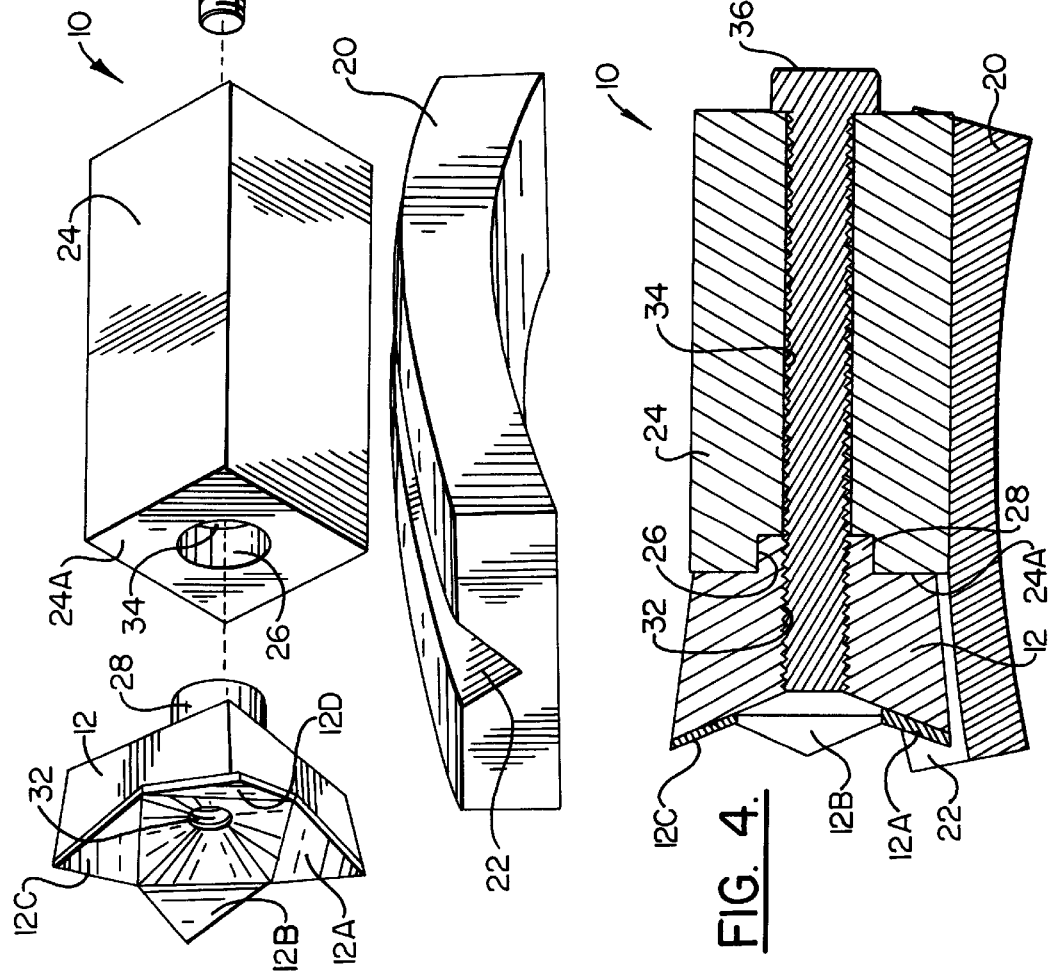

CUTTER TOOTH HOLDER ASSEMBLY

TECHNICAL FIELD AND BACKGROUND OF THE INVENTION

This invention relates to a cutter tooth holder assembly. The invention is particularly adapted for attaching a replaceable cutter tooth to a cutter drum used for clearing trees. The cutter drum is rotatably mounted on the boom of a backhoe. During operation of the cutter drum, the teeth become worn or damaged and must be periodically replaced. A complete description of Applicant's cutter drum is provided in U.S. Ser. No. 08/658,709. This description is incorporated herein by reference.

One problem experienced by the Applicant in using its cutter drum for clearing and mulching trees relates to the attachment of teeth to the drum, and their required maintenance and replacement. Over relatively short periods of use, one or more of the teeth typically break off, while others soon become too worn for effective cutting and mulching. Breakage of a single tooth during operation of the cutter drum can cause substantial damage to the cutter drum and shield, and presents a considerable safety hazard to nearby workers.

The present invention addresses these problems by providing a cutter tooth holder assembly which securely holds and supports the cutter tooth in position during operation of the cutter drum. The invention further allows indexing of the cutter tooth to locate a fresh cutting tip in the cutting position when the old tip becomes worn.

SUMMARY OF THE INVENTION

Therefore, it is an object of the invention to provide a cutter tooth holder assembly which securely holds and supports the cutter tooth in position during operation of the cutter drum.

It is another object of the invention to provide a cutter tooth holder assembly which allows indexing of the cutter tooth to locate a fresh cutting tip in the cutting position when the old tip becomes worn.

It is another object of the invention to provide a tooth holder assembly which helps reduce the occurrence of tooth breakage during operation of the cutter drum.

It is another object of the invention to provide a tooth holder assembly for a cutter tooth which allows the cutter tooth to be easily re-oriented and replaced.

It is another object of the invention to provide a combination tooth holder assembly and cutter tooth adapted for attachment to a cutter drum for producing a fine-cut mulch.

It is another object of the invention to provide a combination tooth holder assembly, cutter tooth, and cutter drum which effectively clears and mulches trees.

These and other objects of the present invention are achieved in the preferred embodiments disclosed below by providing a cutter tooth having a plurality of spaced cutting tips, and a cutter tooth holder assembly adapted for attaching the cutter tooth to a rotatable cutter drum. The tooth holder assembly includes a base for being mounted to an outer peripheral surface of the cutter drum. The base has a tooth-locking, circumferentially-extending groove formed in its top surface. A tooth holder is positioned in the tooth-locking groove, and has a front bearing surface residing adjacent a back end of the cutter tooth. The cutter tooth is arranged such that one of the cutting tips resides in the tooth-locking groove to prevent rotational movement of the cutter tooth during operation of the cutter drum, while an opposed second one of the cutting tips resides in a cutting position relative to the outer surface of the drum. Attaching means cooperates with the tooth holder or attaching the cutter tooth to the tooth holder assembly.

According to one preferred embodiment of the invention, the cutter tooth has a cylindrical connector portion extending from its back end. The connector portion is adapted for being received within a complementary, annular recess formed in the front surface of the tooth holder.

According to another preferred embodiment of the invention, the tooth holder includes a longitudinal opening formed therethrough and extending from one end of the tooth holder to the other.

According to yet another preferred embodiment of the invention, the connector portion of the cutter tooth includes an internally-threaded opening formed in axial alignment with the longitudinal opening through the tooth holder. The attachment means is an elongate bolt which extends through the opening in the tooth holder. The bolt has an external screw thread adapted for mating with the internal screw thread of the cutter tooth to removably attach the cutter tooth to the tooth holder assembly.

According to yet another preferred embodiment of the invention, the tooth holder has a generally square cross-section defining respective corners arranged in substantial alignment with the tips of the cutter tooth.

According to yet another preferred embodiment of the invention, a weld deposit permanently attaches the tooth holder to the base.

According to yet another preferred embodiment of the invention, the length of the tooth holder is about two times the length of the cutter tooth.

According to yet another preferred embodiment of the invention, the base includes a mounting plate having a generally concave bottom surface adapted for residing adjacent the outer peripheral surface of the drum.

According to yet another preferred embodiment of the invention, the tooth-locking groove extends from one end of the base to the other.

According to yet another preferred embodiment of the invention, the tooth-holder and base are integrally formed together.

In another embodiment, a cutter tooth has a plurality of spaced cutting tips and a connector portion opposite the cutting tips. A cutter tooth holder assembly is adapted for attaching the cutter tooth to a rotatable cutter drum. The tooth holder assembly includes a base for being mounted to an outer peripheral surface of the cutter drum. The base has a tooth-locking, circumferentially-extending groove formed in its top surface. A tooth holder is attached to the base and has a generally square cross-section defining respective corners arranged in substantial alignment with the tips of the cutter tooth. One of the corners of the tooth holder is positioned in the tooth-locking groove. The tooth holder further has a front bearing surface with a recess therein for receiving the connector portion of the cutter tooth.

The cutter tooth is arranged such that one of the cutting tips resides in the tooth-locking groove to prevent rotational movement of the cutter tooth during operation of the cutter drum, while an opposed second one of the cutting tips resides in a cutting position relative to the outer surface of the drum. Attaching means cooperates with the tooth holder for attaching the cutter tooth to the tooth holder assembly.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 3 is an exploded, perspective view of the cutter tooth and tooth holder assembly;

FIG. 4 is a longitudinal cross-sectional view of the cutter tooth and tooth holder assembly taken substantially along a centerline thereof; and FIG. 5 is a front elevational view of the cutter tooth and tooth holder assembly.

DESCRIPTION OF THE PREFERRED EMBODIMENT AND BEST MODE

Figure 1:
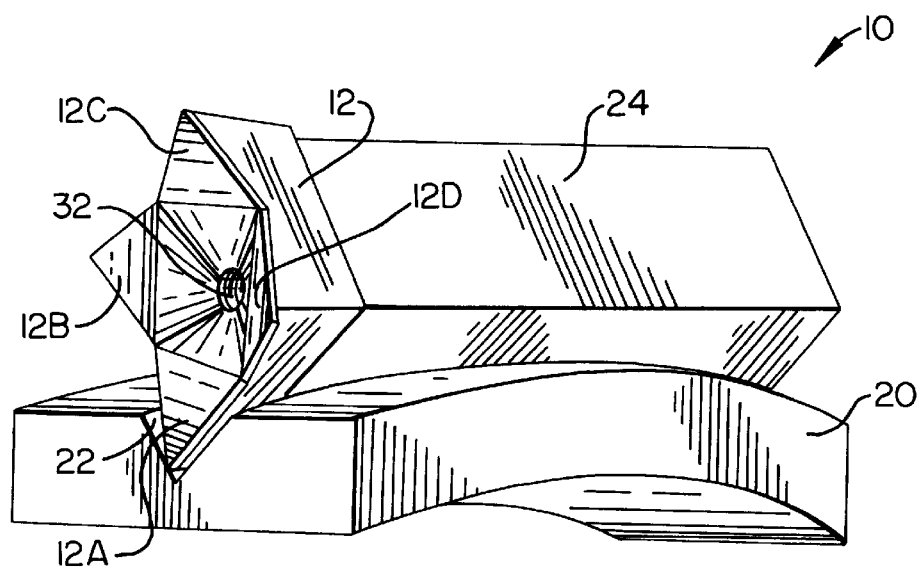
FIG. 1 is a perspective view of a cutter tooth attached to a tooth holder assembly according to one preferred embodiment of the invention.
Figure 2:
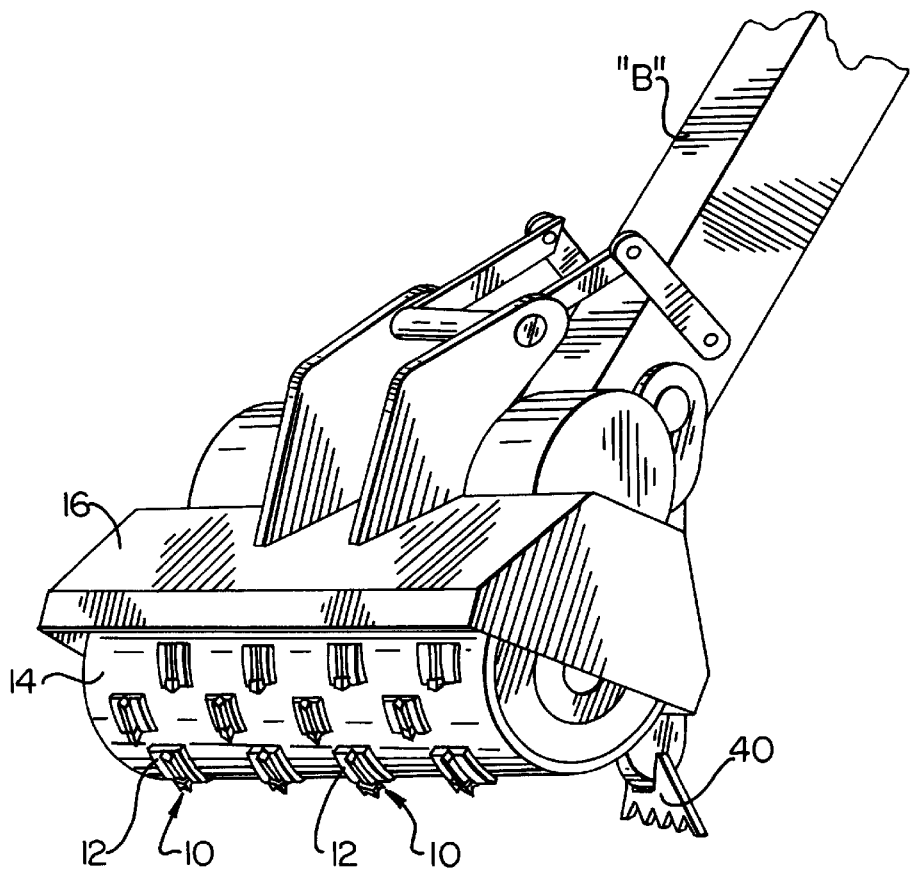
FIG. 2 is a perspective view of a cutter drum with cutter teeth and tooth holder assemblies mounted to its outer peripheral surface.

Referring now specifically to the drawings, a cutter tooth holder assembly according to the present invention is illustrated in FIG. 1 and shown generally at reference numeral 10. The tooth holder assembly 10 is particularly applicable for attaching a replaceable cutter tooth 12 to a cutter drum 14, such as that shown in FIG. 2, used for cutting and mulching trees. The cutter drum 14 is rotatably mounted on the boom "B" of a backhoe (not shown), and includes a drum shield 16 for containing the deflection of wood debris during cutting and mulching. The cutter tooth 12 includes a number of spaced cutting tips 12A, 12B, 12C, and 12D which are subject to wear, requiring the cutter tooth 12 to be periodically replaced when worn.

A further detailed description of the cutter tooth 12 is provided in U.S. Pat. No. 5,307,719 issued to Quadco Equipment Inc. of Quebec, Canada. The complete disclosure of this patent is incorporated herein by reference thereto.

Referring now to FIGS. 1 and 3, the tooth holder assembly 10 is formed of a mounting plate 20 having a generally concave bottom surface for engaging the outer peripheral surface of the drum 14, and a top surface with a circumferentially-extending tooth-locking groove 22 formed along its entire length from one end of the plate 20 to the other. Preferably, the mounting plate 20 is permanently attached to the drum 14 by welding.

A tooth holder 24 having a generally square cross-section is positioned in the tooth-locking groove 22 of the mounting plate 20 and permanently attached to the mounting plate 20 by welding. The tooth holder 24 and mounting plate 20 may, alternatively, be cast as a single integrally-formed part. As best shown in FIG. 3, an annular recess 26 is formed in a front bearing surface 24A of the tooth holder 24, and is adapted for receiving a cylindrical connector portion 28 of the cutter tooth 12. The cutter tooth 12 is oriented such that one of its cutting tips 12A resides in the tooth-locking groove, while an opposed second one of its cutter tips 12C resides in a cutting position relative to the outer surface of the drum 14. The angled walls of the mounting plate 20 defining the tooth-locking groove 22 prevent rotational movement of the tooth 12 during operation of the cutter drum 14.

The corners of the tooth holder 24 are arranged in substantial alignment with the tips 12A–12D of the cutter tooth 12. The front bearing surface 24A is preferably entirely flat and engages the back of the cutter tooth 12 during cutting and mulching. Upon impact of the cutter tooth 12 and tree, the bearing surface 24A transfers this energy directly to the cutter drum 14. This reduces the occurrence of tooth breakage and other damage to the tooth 12 and tooth holder 24.

Referring to FIG. 4, the connector portion 28 of the cutter tooth 12 includes an internally-threaded opening 32 which is arranged in axial alignment with a longitudinal bolt opening 34 extending through the tooth holder 24. A conventional bolt 36 shown in FIGS. 3 and 4 is received through the bolt opening 34 and into the threaded opening 32 of the cutter tooth 12. The bolt 36 has an external screw thread which mates with the internal thread of the opening 32 to removably attach the cutter tooth 12 to the tooth holder 24. When the tip 12C of the cutter tooth 12 begins to wear, the tooth 12 is re-oriented such that a fresh tip 12A resides the cutting position, while the worn tip 12C is moved to the locking position within the tooth-locking groove 22. The other tips 12B and 12D reside in a mulching position, and are effective for mulching the cut wood debris as it passes beneath the shield 16 of the cutter drum 14. When all of the tips 12A–12D are worn, the cutter tooth 12 is replaced by removing the bolt 36 and adding a new tooth.

According to one embodiment of the invention, the length of the tooth holder 24 is about 3 inches, and the length of the cutter tooth 12 as measured from one of its cutting tips 12A–12D to its back surface is about 1½ inches. Each tooth 12 is indexed to expose only one tip 12A–12D in the cutting position at a time, thus minimizing drag on the rotating cutter drum 14 during operation.

The cutter teeth 12 are preferably attached to the periphery of the drum 14 in ten (10) circumferentially-spaced rows with four (4) teeth 12 per row. As the drum 14 rotates, the first row contacts the tree first. The second row then contacts the tree at a point about 1⅝ inches to the left of the first row. The third row then hits at about 1⅝ inches to the right of first row. The forth row hits at about 3¼ inches to the left of first row, and the fifth row hit at about 3¼ inches to the right of first row through 180° of the drum circumference. The next 5 rows have the same pattern except that they are shifted about 13/16ths inches to the right of the first row. This tooth pattern helps produce a complete, fine-cut mulch.

According to one technique of cutting trees using the cutter drum 14, the backhoe operator maneuvers the boom "B" such that an outward projecting thumb 40 adjacent the cutter drum 14 engages the tree at a point above the ground to push the tree in a direction away from the backhoe. With the thumb 40 engaged, the cutter drum 14 pivots on the end of the boom "B" to move the cutter teeth 12 of the rotating drum 14 into engagement with the tree. As the teeth 12 cut through the tree, gravity causes the cut portion of the tree to fall safely away from the backhoe in the direction of force applied by the thumb 40. The remaining trunk of the tree is then ground away by moving the cutter 14 downwardly over the top of the trunk to the ground surface.

A cutter tooth holder assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In combination with a cutter tooth having a plurality of spaced cutting tips, the improvement comprising a cutter tooth holder assembly adapted for attaching the cutter tooth to a rotatable cutter drum, said tooth holder assembly comprising:

(a) a base for being mounted to an outer peripheral surface of the cutter drum and having a tooth-locking groove formed in a top surface thereof;

(b) a tooth holder positioned in the tooth-locking groove, and having a front bearing surface residing adjacent a back end of said cutter tooth;

(c) said cutter tooth being arranged such that one of said cutting tips resides in said tooth-locking groove to protect said cutting tip and to prevent rotational movement of the cutter tooth during operation of the cutter drum, while an opposed second one of said cutting tips resides in a cutting position relative to the outer surface of the drum; and (d) attaching means cooperating with said tooth holder for attaching the cutter tooth to the tooth holder assembly.

2. A combination according to claim 1, wherein said cutter tooth has a cylindrical connector portion extending from its back end and adapted for being received in a complementary, annular recess formed in the front surface of said tooth holder.

3. A combination according to claim 2, wherein said tooth holder includes a longitudinal opening formed therethrough and extending from one end of the tooth holder to the other.

4. A combination according to claim 3, wherein the connector portion of said cutter tooth includes an internally-threaded opening formed in axial alignment with the longitudinal opening through said tooth holder, and wherein said attachment means comprises an elongate bolt extending through the opening in said tooth holder and having an external screw thread adapted for mating with the internal screw thread of said cutter tooth to removably attach said cutter tooth to the tooth holder assembly.

5. A combination according to claim 1, wherein said tooth holder has a generally square cross-section defining respective corners arranged in substantial alignment with the tips of said cutter tooth.

6. A combination according to claim 1, and comprising a weld deposit for permanently attaching the tooth holder to the base.

7. A combination according to claim 1, wherein the length of said tooth holder is about two times the length of said cutter tooth.

8. A combination according to claim 1, wherein said base comprises a mounting plate having a generally concave bottom surface adapted for residing adjacent the outer peripheral surface of the drum.

9. A combination according to claim 1, wherein said tooth-locking groove extends from one end of said base to the other.

10. A combination according to claim 1, wherein said tooth-holder and base are integrally formed together.

11. In combination with a cutter tooth having a plurality of spaced cutting tips and a connector portion opposite the cutting tips, the improvement comprising a cutter tooth holder assembly adapted for attaching the cutter tooth to a rotatable cutter drum, said tooth holder assembly comprising:

(a) a base for being mounted to an outer peripheral surface of the cutter drum and having a tooth-locking, circumferentially-extending groove formed in a top surface thereof;

(b) a tooth holder mounted on said base and having a generally square cross-section defining respective corners arranged in substantial alignment with the tips of said cutter tooth, and one of said corners being positioned in the tooth-locking groove, said tooth holder having a front bearing surface with a recess therein for receiving the connector portion of said cutter tooth;

(c) said cutter tooth being arranged such that one of said cutting tips resides in said tooth-locking groove to protect said cutting tip and to prevent rotational movement of the cutter tooth during operation of the cutter drum, while an opposed second one of said cutting tips resides in a cutting position relative to the outer surface of the drum; and (d) attaching means cooperating with said tooth holder for attaching the cutter tooth to the tooth holder assembly.

12. In combination with a rotatable cutter drum comprising a plurality of circumferentially-spaced cutter teeth each having a plurality of spaced cutting tips, the improvement comprising a cutter tooth holder assembly for attaching respective cutter teeth to the cutter drum, said tooth holder assembly comprising:

(a) a base mounted to an outer peripheral surface of the cutter drum and having a tooth-locking groove formed in a top surface thereof;

(b) a tooth holder attached to said base and positioned in the tooth-locking groove, said tooth holder having a front bearing surface residing adjacent a back end of said cutter tooth;

(c) said cutter tooth being arranged such that one of said cutting tips resides in said tooth-locking groove to protect said cutting tip and to prevent rotational movement of the cutter tooth during operation of the cutter drum, while an opposed second one of said cutting tips resides in a cutting position relative to the outer surface of the drum; and (d) attaching means cooperating with said tooth holder for attaching the cutter tooth to the tooth holder assembly.

* * * * *